No. 856,977. PATENTED JUNE 11, 1907.
T. H. MOONEY.
FLEXIBLE STAY BOLT.
APPLICATION FILED OCT. 8, 1906.
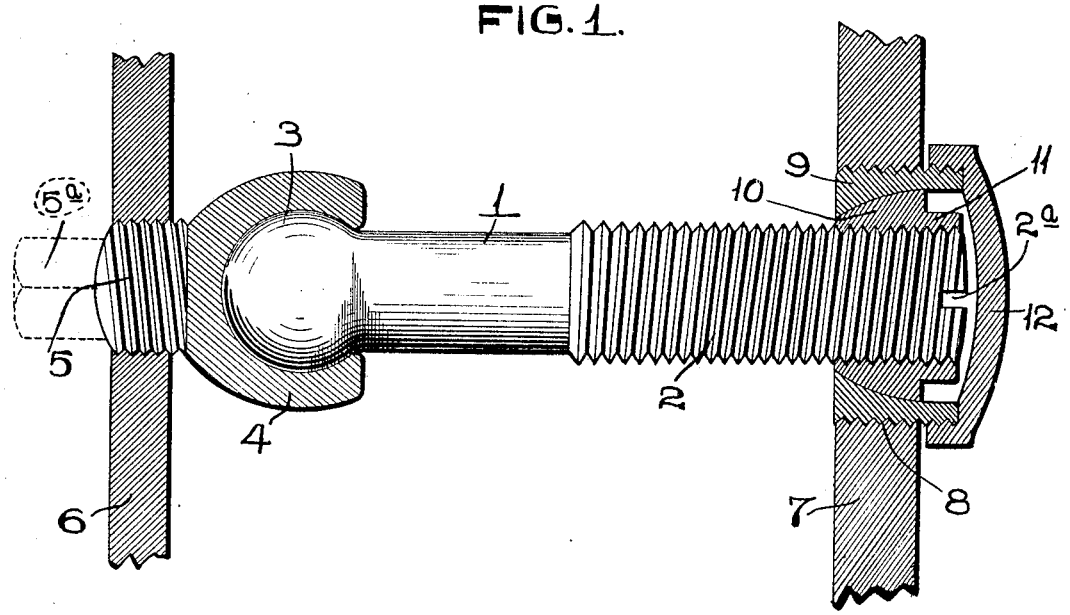
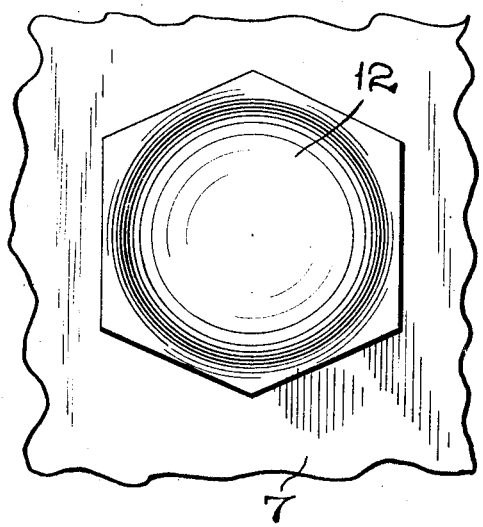 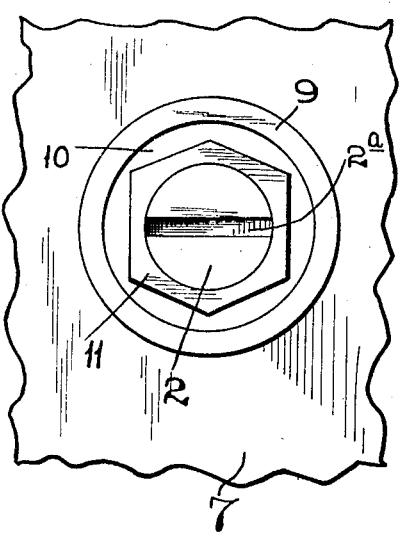
ATTEST—
INVENTOR—
T. H. MOONEY.
BY
ATTYS.

UNITED STATES PATENT OFFICE.

THOMAS H. MOONEY, OF HOUSTON, TEXAS.

FLEXIBLE STAY-BOLT.

No. 856,977.  Specification of Letters Patent.  Patented June 11, 1907.

Application filed October 8, 1906. Serial No. 337,878.

*To all whom it may concern:*

Be it known that I, THOMAS H. MOONEY, a citizen of the United States, and a resident of Houston, Texas, have invented certain new and useful Improvements in Flexible Stay-Bolts, of which the following is a specification containing a full, clear, and exact description, reference being had to the accompanying drawings, forming a part hereof.

My invention relates to a flexible stay bolt, such as is particularly adapted for use in steam boilers, and which stay bolt is constructed with a flexible joint at both ends, or at the points where said bolt connects with the boiler sheets.

To the above purposes, my invention consists in certain novel features of construction and arrangement of parts, which will be hereinafter more fully set forth, pointed out in the claims, and illustrated in the accompanying drawings, in which:—

Figure 1 is a section through portions of the boiler sheets, and showing my improved stay bolt connecting said sheets; Fig. 2 is an elevation of the cap that is located on a socket at one end of the bolt in order to provide a steam tight joint; Fig. 3 is an elevation of the end of the stay bolt which is located in the socket, and with the cap removed therefrom.

Referring by numerals to the accompanying drawings, 1 designates the body of my improved stay bolt, which is of the usual form, with one end exteriorly screw threaded, as indicated by 2, and the opposite end being provided with an integral hemispherical head 3. This head fits snugly within a cup 4, which is provided with an integral screw threaded shank 5, and which is screw seated in one of the boiler sheets 6. This shank is provided with an angular projection 5ª to be engaged by a wrench for screwing said shank into the sheet, and which projection is subsequently removed in any suitable manner.

The arrangement of the head 3 in the cup 4 provides for a universal joint between the bolt and said cup.

Formed in the opposite boiler sheet 7, in direct alinement with the cup 4, is a screw threaded aperture 8, of sufficient size to allow the insertion of the cup 4, and seated in said aperture is a socket 9, the aperture through which curves gradually inward from the outer face of said socket.

The screw threaded end of the bolt 1 passes through this socket 9, and receives a nut 10, the exterior surface of which is curved to fit the inner surface of the socket 9, and which nut is provided with an integral head 11, having angular faces which are adapted to receive a wrench, or similar tool, used for screwing the nut onto the end of the bolt 1.

A slot 2ª is formed in the screw threaded end of the bolt 1 in which a suitable tool is located to hold said bolt when the nut 10 is being seated thereon.

12 designates a cap, which is interiorly screw threaded, and which is seated upon the extended end of the socket 9, thus inclosing the nut 10, and forming a perfectly steam tight joint at this end of the stay bolt.

The arrangement just described provides for a universal joint at the outer end of the stay bolt, and thus said stay bolt is provided at each end with a flexible joint, whereby any movement of one boiler sheet relative the other is permitted, and at the same time said sheets being very rigidly connected.

A stay bolt of my improved construction is simple, strong, and durable, easily placed in position, and yields readily to the movement of either sheet.

I claim:—

The combination with a pair of boiler sheets, of a cup fixed to one of the sheets, a stay bolt, a spherical head integral with one end of the stay bolt which head is seated in the cup, a socket seated in the opposite sheet in which socket is formed a semicircular seat, a nut adjustably seated on the end of the stay bolt opposite the end provided with a head and which nut has a curved surface adapted to fit the semicircular seat in the socket, and a cap detachably secured to the socket and which incloses the nut and end of the stay bolt.

In testimony whereof, I have signed my name to this specification, in presence of two subscribing witnesses.

THOMAS H. MOONEY.

Witnesses:
JOHN W. HAZARD,
M. STUBENRANCH.